United States Patent [19]
Deegener et al.

[11] Patent Number: 4,919,488
[45] Date of Patent: Apr. 24, 1990

[54] VEHICLE SEAT WITH A SAFETY BELT SYSTEM

[75] Inventors: Elmar Deegener, Stelzenberg; Harald Wolsiefer; Heinz P. Cremer, both of Kaiserslautern, all of Fed. Rep. of Germany

[73] Assignee: Keiper Recaro GmbH & Co., Fed. Rep. of Germany

[21] Appl. No.: 352,890

[22] Filed: May 17, 1989

[51] Int. Cl.⁵ .............................................. A47C 31/00
[52] U.S. Cl. .................................. 297/468; 297/481; 297/484
[58] Field of Search ............... 297/468, 481, 483, 484, 297/487, 488, 479; 280/808, 807, 801

[56] References Cited

U.S. PATENT DOCUMENTS

| | | | |
|---|---|---|---|
| 4,120,531 | 10/1978 | Fefferman | 297/481 X |
| 4,175,787 | 11/1979 | Muskat | 297/484 |
| 4,429,916 | 2/1984 | Hyde et al. | 297/488 X |
| 4,579,191 | 4/1986 | Klee et al. | 297/488 X |
| 4,662,683 | 5/1987 | Knoedler et al. | 297/487 X |
| 4,813,746 | 3/1987 | Mulholland | 297/488 |

FOREIGN PATENT DOCUMENTS

| | | |
|---|---|---|
| 2036354 | 2/1971 | Fed. Rep. of Germany . |
| 2222251 | 12/1972 | Fed. Rep. of Germany ...... 297/484 |
| 3007645 | 1/1981 | Fed. Rep. of Germany . |
| 3310392 | 10/1984 | Fed. Rep. of Germany . |
| 930802 | 8/1969 | United Kingdom ........... 297/481 X |
| 1189985 | 4/1970 | United Kingdom . |
| 2144323 | 3/1985 | United Kingdom ................ 297/468 |

Primary Examiner—Jose V. Chen
Attorney, Agent, or Firm—Wigman & Cohen

[57] ABSTRACT

In a vehicle seat having a safety belt system, the belts of which are connected with the seat frame in the area of the upper end section of the back rest at two upper connecting points lying spaced from each other in the lateral direction of the seat, and in the area of the rear end of its seat portion, the lower end of its back rest or its support slide rails at two lower connection points provided on the respective sides of the seat, the two lap belts are guided along the respective pivot arms (12,12') which are connected with the seat frame in the area of one or the other of the lower connecting points (5) so as to pivot about respective axes extending in the lateral direction of the seat. The two pivot arms (12,12') are formed to resist bending in the pivot direction but to bend elastically laterally thereto. The one pivot arm (12) is connected with the other pivot arm (12') by a transmission that forces an opposite pivot direction. The two shoulder belts (4) run from the respective upper connection points to the associated element (14,15) of the belt closure, because the lap belt (6) is attached to the same side of the seat.

10 Claims, 4 Drawing Sheets

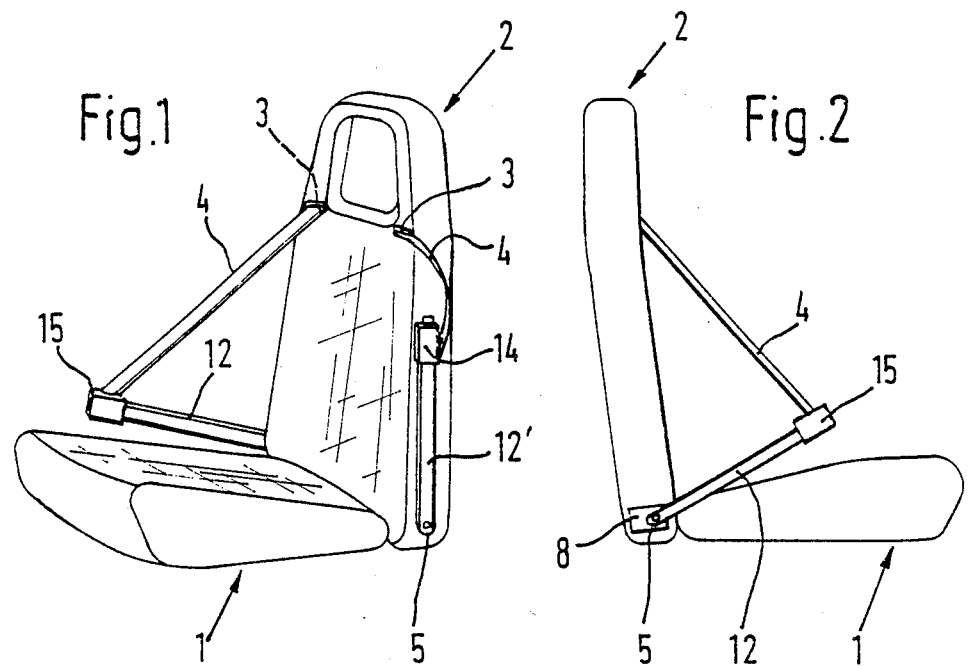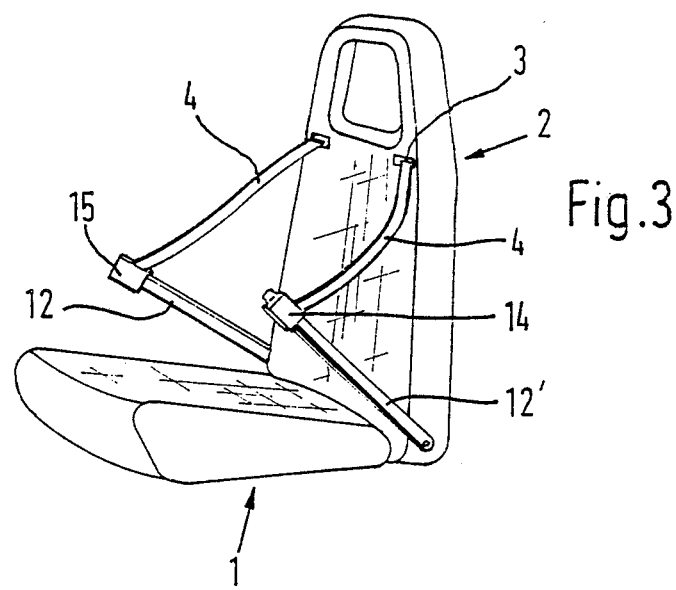

VEHICLE SEAT WITH A SAFETY BELT SYSTEM

BACKGROUND OF THE INVENTION

The present invention relates to a vehicle seat having a safety belt system, and more particularly to such a system the belts of which are connected with the seat structure in the area of the upper end section of the back rest on two upper connecting points that lie spaced from each other in the lateral direction of the seat, and in the area of the rear end of its seat portion, the belts of which are connected with the lower end of its back rest or its supporting slide rails on two lower connecting points provided on the respective sides of the seat.

In known seats of this type the safety belt system is formed as a so-called suspender belt. A belt system of this type offers greater safety than the common three-point belt system. However, its convenience in attachment and release is significantly less than that of the accessability of the three-point belt system.

To the extent that belt connection aids have become known, they are very expensive and are conformed only to three-point belt systems, but cannot be used with a four-point belt system.

SUMMARY AND OBJECTS OF THE INVENTION

In view of the foregoing limitations and shortcomings of the prior art devices, as well as other disadvantages not specifically mentioned above, it is a primary object of the invention to create a vehicle seat with a four-point safety belt system, in which the belt system can be put on and removed without difficulty. Briefly described, this object is accomplished according to the invention by providing a vehicle seat having two lap belts, each running from one of respective lower connection points to one of the respective elements of a belt closure, and two shoulder belts, each running from one of respective upper connection points to one of the respective elements of the belt closure. First and second pivot arms for guiding the respective lap belts are connected with the seat frame in the area of one of the lower connection points so as to pivot about respective axes extending in the lateral direction of the seat. The two pivot arms are formed so as to resist bending in the pivot plane, and to be elastically flexible laterally thereto, and are connected with each other by a transmission that forces an opposite pivot movement. Further, the second pivot arm is arranged on the access side of the seat and lies upright at the side of the seat adjacent to the back rest in its stowed position, and the first pivot arm extends forward and holds the sholder belt connected therewith at least nearly tensed when the second pivot arm is in its stowed position.

To employ this safety belt system, the seat user need only pivot the one pivot arm out of its stowed position into the employed position. Due to the transmission connection with the other pivot arm, this second pivot arm is also pivoted into the correct position to be employed. After this is done, all that remains is to bring the two closure elements together and to insert one into the other, which, due to the elastic flexibility of the pivot arms laterally to the pivot direction, is also simple to perform.

The belt system can be removed just as easily, because after the closure is released, only one of the two pivot arms need be pivoted back into its stowed position. Further material advantages of the solution according to the invention include the fact that the expense for the belt placement aid is very low, and that in its stowed position the pivot arm remains in a defined position that does not impair access to or departure from the seat.

The two lap belts can be arranged on the side of their associated pivot arm facing the seat user or on the side opposite the seat user. In one preferred embodiment, however, the lap belts lie in a longitudinal channel in the pivot arm that is adapted to the shape of the belt, and the exterior shape of the pivot arm preferably has the form of an extended rectangle. This strap-like form of the pivot arm namely also gives the necessary rigidity in the pivot direction and the necessary elastic flexibility laterally to the pivot direction.

In order to be able to easily grasp the closure elements, the pivot arms preferably extend to the closure elements. A further advantage of this type of embodiment of the pivot arms is that, on the side at which the pivot arm extends toward the front end of the seat in the stowed position, there is a maximum amount of free space between the tensed shoulder belt and the seat surface and back rest of the seat, which is desirable in the interest of a comfortable insertion of the arm beneath and through this shoulder belt.

A single-stage spur wheel transmission is adequate as the drive mechanism, because the purpose of the drive is simply to compel reciprocating pivot movements of the two pivot arms.

In one preferred embodiment the drive is arranged on one side of the seat. A shaft extends laterally relative to the seat from the single gear of the transmission toward the other side of the seat to the pivot arm arranged there, whereas the opposite pivot arm is connected with the shaft of the other gear so as to rotate together therewith.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a schematic view of the exemplary embodiment, illustrated in perspective, with the two pivot arms in the stowed position, as viewed from one side.

FIG. 2 is a schematically illustrated side view with a viewing direction from the opposite side, with the pivot levers in the stowed position.

FIG. 3 is a schematic view of the exemplary embodiment, illustrated in perspective, with the pivot levers in the closed position.

DETAILED DESCRIPTION OF A PREFERRED EMBODIMENT

Figure 7:
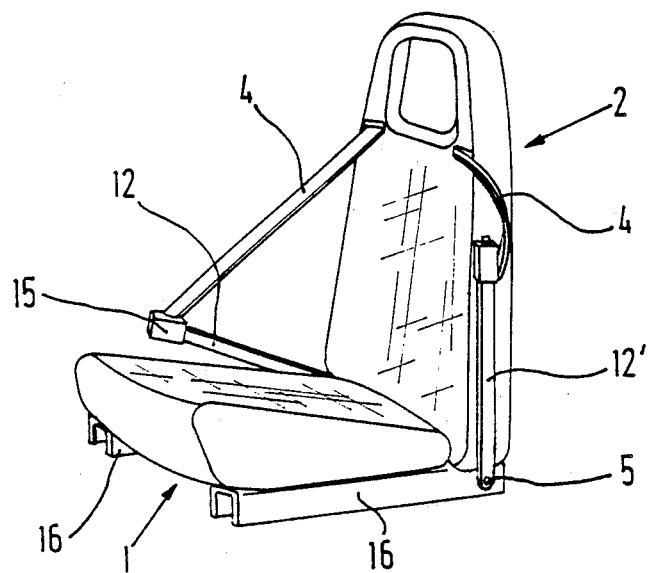
FIG. 7 is a view, similar to FIG. 1, illustrating an additional embodiment of the invention in which the lower ends of the lap belts and pivot arms are connected to the supporting rails of the seat.
Figure 8:
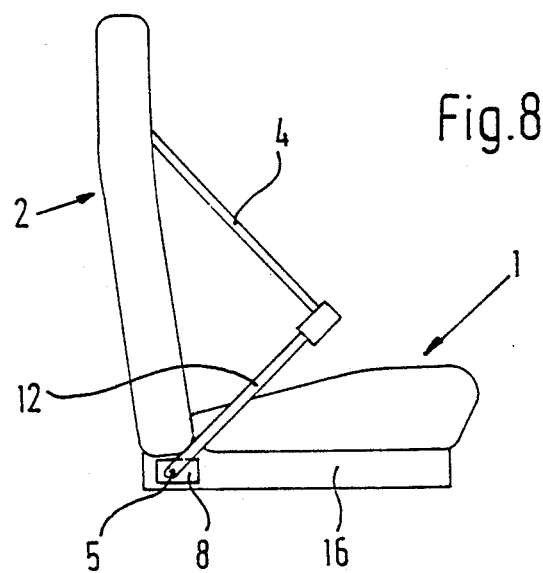
FIG. 8 is a view, similar to FIG. 2, further illustrating the embodiment of FIG. 7.
Figure 9:
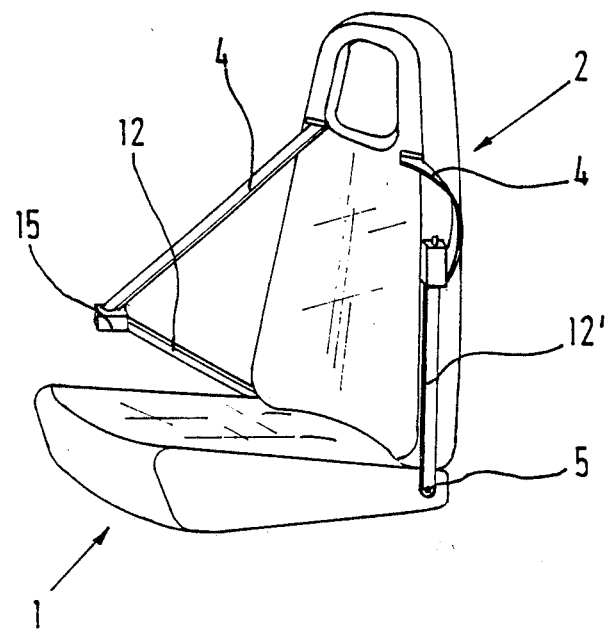
FIG. 9 is a view, similar to FIGS. 1 and 7, illustrating an additional embodiment of the invention in which the lower ends of the lap belts and pivot arms are connected to the rear end of the seat portion of the vehicle seat.
Figure 10:
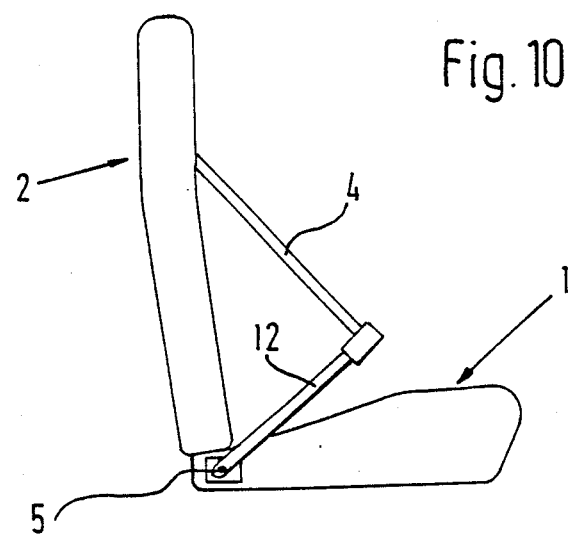
FIG. 10 is a view, similar to FIGS. 2 and 8, further illustrating the embodiment of FIG. 9.

Referring now in detail to the drawing wherein like parts are designated by like reference numerals throughout, there is illustrated in FIGS. 1 through 3 a motor vehicle seat comprising a seat portion 1 and a back rest 2, has a seat frame (not illustrated) that can support heavy loads because the back rest 2 serves not only as an upholstery support, but must also be capable of absorbing the great forces placed on a safety belt system in an accident. Respective belt retracting rollers having automatically acting blocks for the respective shoulder belts 4 are attached to the frame of the back rest 2, namely on both sides in the area of the transition from the section that supports the shoulders of a seat user to a head rest formed on the back rest. These belt retracting rollers are formed in a known manner. All that is visible is the slot-forming exit openings 3 in the upholstery, which are aligned respectively with the belt retracting rollers. A lower connection point 5 for the respective lap belts 6 are provided on each side near to the lower end of the back rest 2. Of course it would also be possible to arrange the two lower connection points 5 on the rear end of the seat portion 1, as illustrated in FIGS. 9 and 10 or on the two commonly provided supporting slide rails 16 that support the entire seat, as illustrated in FIGS. 7 and 8 or to provide the two hinge fittings, which commonly connect the back rest 2 with the seat portion 1, with the two lower connection points.

Figure 5:
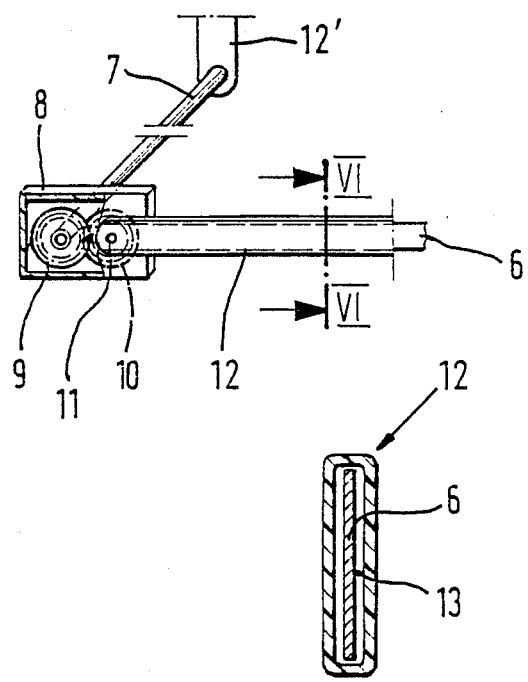
FIG. 5 is an enlarged, partial view of the pivot lever and the transmission that connects them.
Figure 6:
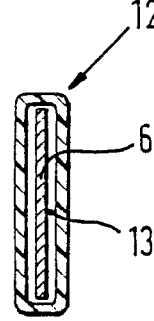
FIG. 6 is an enlarged section according to the line VI—VI in FIG. 5.

On one side of the seat the lower connection point 5 is formed by the end section of a connection shaft 7 (FIG. 5), which passes through the back rest 2 from one side to the other and is rotatably mounted on the frame of the back rest 2. The other end of the connecting shaft 7 extends into a transmission housing 8 arranged on the side of the back rest 2 and therein supports a first spur wheel 9 that is rigidly connected with the connecting shaft 7. A second spur wheel 10, that meshes with the first spur wheel 9 and therewith forms a single-stage transmission with a transfer ration 1:1, is securely arranged on a shaft pin 11, which projects out of the transmission housing 8 on the side opposite the back rest 2 and is there securely connected with one end of a plastic pivot arm 12. The pivot arm 12 has the shape of a strap, which, as shown in FIG. 6 is provided with a longitudinal channel 13, the cross-section of which is adapted, with adequate play, to the cross-sectional shape of the lap belt 6, thus forming a long rectangle. The exterior cross-sectional shape of the pivot arm 12 has a similar rectangular shape, whereby the two long sides of the rectangle lie in the pivot plane of the pivot arm 12. The pivot arm 12 namely has to be rigid in the pivot direction. In contrast, laterally to the pivot direction it is elastically flexible. A correspondingly shaped pivot arm 12', is rigidly connected with the end of the connecting shaft 7 that projects beyond the side surface of the back rest 2 opposite the transmission housing 8.

One element 14 of a belt closure is fixed to the free end of the pivot arm 12', and the corresponding element 15 of the belt closure is fixed to the free end of the other pivot arm 12. The length of the two pivot arms 12 and 12' is therefore selected such that the elements 14 and 15 can be connected in front of the body of the seat user without any appreciable amount of slack. The two lap belts 6, which are securely connected with the elements 14 and 15, respectively, of the belt closure and which must assume the tensile loads that occur, are connected at their other ends with the frame of the back rest 2 by means of the transmission housing 8 and the shaft pin 11.

The shoulder belt 4 is guided from the exit opening 3 lying above the transmission housing 8 to the element 15 of the belt closure connected to the pivot arm 12 arranged on the side of the transmission housing 8. The other shoulder belt 4 runs from the other exit opening 3 to the element 14 of the belt closure.

Figure 4:
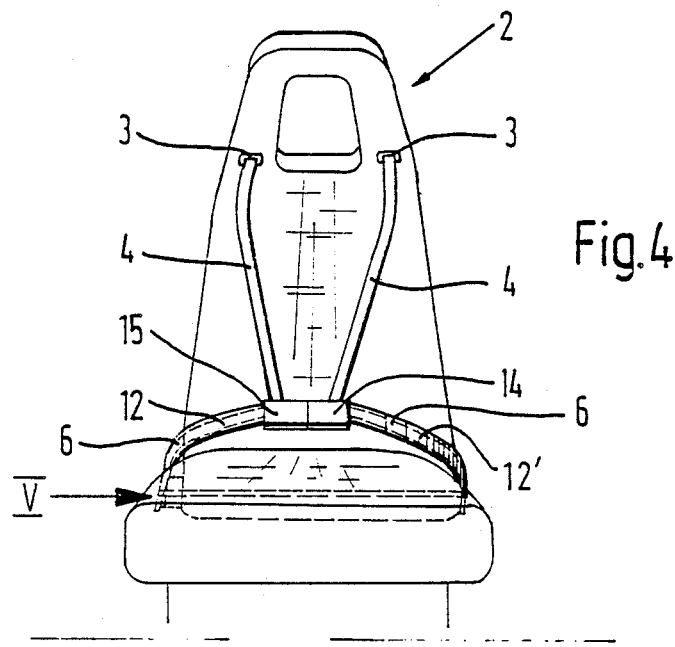
FIG. 4 is a view of the exemplary embodiment viewed from the front, with the belt system closed.

As shown particularly in FIG. 1, the pivot arm 12', which is located on the side of the back rest 2 adjacent to the vehicle door, can be pivoted into a stowed position where it extends upward in the direction of the back rest 2. The other pivot arm 12, in its stowed position, extends forward and slightly upward, so that it, or the element 15 of the belt closure it carries, can be easily grasped by hand by the seat user. The shoulder belt 4 leading to the element 15 of the belt closure thereby is at least somewhat tensed. Accordingly, in the stowed position of the two pivot arms 12 and 12', the two shoulder belts 4 thus assume a defined position. In addition, in this stowed position, neither the pivot arms 12 and 12' nor the shoulder belts 4 can impair access to the seat. In addition, the fact that the inside shoulder belt 4 runs forward and downward at an angle from its exit opening 3 enables the seat user to comfortably pass beneath this shoulder belt 4 and thereby place it over his shoulder. If the seat user then pivots the associated pivot arm 12 upward, the other pivot arm 12' pivots downward. The seat user can then comfortably pass his arm beneath the shoulder belt 4 on the access side and place this shoulder belt on the shoulder adjacent the door. From the positions of the two pivot arms 12 and 12' illustrated in FIG. 3, where the pivot arms enclose equal angles with the back rest 2 or the seat portion 1, the two elements 14 and 15 of the belt closure are moved together and one is inserted into the other. Because of the elastic flexibility of the two pivot arms 12 and 12' laterally to their pivot direction, the necessary force required in order to bring the two elements 14 and 15 of the belt closure into the closed position illustrated in FIG. 4 is very small. In this closure position the two shoulder belts 4 pass over the breast of the seat user with a decreasing distance from the belt closure, from where the two lap belts 6 run to the two lower connection points 5.

After the belt closure is opened, the two pivot arms 12 and 12' automatically return into their straight positions. The seat user need only take his arms out from under the two shoulder belts 4 that run downward and to the front, and then pivot the inside pivot arm 12 downward or the outside pivot arm 12' upward, whereby the two spur gears 9 and 10 force the opposite respective pivot movement.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A vehicle seat having a seat portion supported on slide rails, a back rest, and a safety belt system having a belt closure with two closure elements, the belts of which are connected in the area of the upper end section of the back rest to two upper connection points lying spaced from each other in the lateral direction of the seat, and in the area of the rear end of its seat portion, are connected to one of the lower ends of the back rest, said seat portion, or said slide rails, at two lower connecting points provided on the respective sides of the seat, one of said respective sides of the seat being an access side, comprising:

two lap belts (6) each running from one of the respective lower connecting points (5) to said closure elements (14, 15), respectively, of said belt closure;

two shoulder belts (4), each running from one of the respective upper connecting points to one of said closure elements (14, 15) of the belt closure, each of said lap belts (6) being guided by one of said shoulder belts (4);

first and second pivot arms (12, 12'), each defining a respective pivot plane for guiding the respective lap belts (6), said pivot arms (12, 12') being connected with the seat frame in the area of one of the lower connecting points (5) respectively, so as to pivot about respective axes (8, 11) extending in the lateral direction of the seat;

said two pivot arms (12, 12') being formed so as to resist bending in their respective pivot planes and to be elastically flexible laterally thereto;

said first pivot arm (12) being connected with the other pivot arm (12') by gear means (8, 9, 10), the output of which is opposite to the input pivot movement;

wherein said second pivot arm (12') is arranged on the access side of the seat and lies upright at the side of the seat adjacent to the back rest (2) in its stowed position, and said first pivot arm (12) extends forward and holds the shoulder belt (4) connected therewith at least nearly tensed when said second pivot arm is in its stowed position.

2. The vehicle seat according to claim 1, wherein each of the two pivot arms (12, 12') is formed as a plastic strap having guide elements that overlap the lap belt (6) connected therewith.

3. The vehicle seat according to claim 2, wherein the guide elements are formed on the straps.

4. The vehicle seat according to claim 3, wherein each of the pivot arms forms a longitudinal channel containing one of said lap belts (6), the outer walls of said channels forming said guide elements for the lap belts (6).

5. The vehicle seat according to claim 4, wherein the longitudinal channel (13) is closed to form a tubular-shaped element.

6. The vehicle seat according to claim 4, wherein both the cross-sectional shape of the longitudinal channel (13) and the outside cross-sectional contour of the pivot arm (12, 12') have the shape of a rectangle that is stretched in the direction of pivoting.

7. The vehicle seat according to claim 1, wherein each of said pivot arms (12, 12') extends from the lower connecting point (5) to one of said closure elements (14, 15).

8. The vehicle seat according to claim 1, wherein said gear means (8, 9, 10) is a single-stage spur gear.

9. The vehicle seat according to claim 8, further comprising a shaft (7) that extends from one side of the seat to the other, one end of said shaft being connected to said second pivot arm (12') and the other end of said shaft being connected at least indirectly with a first gear (9) of the transmission so as to rotate therewith, with said first pivot arm (12) being non-rotatably connected to a second spur gear (10) that meshes with the first gear (9).

10. The vehicle seat according to claim 1, wherein said gear means (8, 9, 10) is arranged on one side of the seat.

* * * * *